Oct. 14, 1958 V. P. MATHEWS 2,856,050
FRICTION CLUTCH WITH LUBRICATING MEANS FOR CLUTCH FACER
Filed May 20, 1953

INVENTOR.
Verner P. Mathews
BY
Attorney

United States Patent Office 2,856,050
Patented Oct. 14, 1958

2,856,050

FRICTION CLUTCH WITH LUBRICATING MEANS FOR CLUTCH FACER

Verner P. Mathews, Flint, Mich., assignor to General Motors Corporation, Detroit, Mich., a corporation of Delaware Application May 20, 1953, Serial No. 356,271

4 Claims. (Cl. 192—113)

This invention relates to friction material and more particularly to friction material including porous metal.

It is therefore one object of the invention to provide a friction surface including at least a portion of porous metal which is particularly adapted for use in wet clutches and the like.

It is another object of the present invention to provide a porous metal friction surface for a structure adapted for operating in a fluid whereby fluids entrapped between contacting friction surfaces may pass through the porous material into exhaust channels.

It is a further object of the present invention to provide a structure adapted for use in brakes, clutches and the like which operate in a fluid wherein at least one of the friction members has at least a portion of its friction surface made of porous metal and which includes a plurality of channels therein in contact with said porous metal for conducting fluids away from said porous metal during engagements of the various elements of the structure.

Another object of the present invention is to provide a member, adapted for frictional engagement with a second member, which has at least a portion of its engaging surface formed from porous metal and which has a plurality of radial grooves in contact with certain portions of the porous metal together with a spiral groove formed in the friction face thereof, whereby fluids contained in any of said grooves may pass through said porous metal during frictional engagement of said member with said second member.

A further object of the present invention is to provide a channel in a member having at least a portion thereof adapted for forming a frictional engagement with a second member and wherein said members operate in a fluid, said channel being adapted for conducting fluid entrapped between said members and passing said fluid through porous metal which forms at least a portion of the engaging surface of one of said members.

Another object of the present invention is to provide a structure adapted to rotate in a fluid and have a surface thereof adapted for frictional engagement with a surface of a second member, said structure having a porous metal facing forming at least a portion of the friction surface, a plurality of radial channels in contact with certain portions of said porous facing and a spiral groove on the friction face whereby fluids conducted by said channels may pass through said porous metal into said spiral groove or may pass from said groove through said porous metal as centrifugal force moves the fluid along the spiral groove during rotation of the structure.

Further objects and advantages of the present invention will be apparent from the following description, reference being had to the accompanying drawings wherein a preferred embodiment of the present invention is clearly shown.

Figure 2:
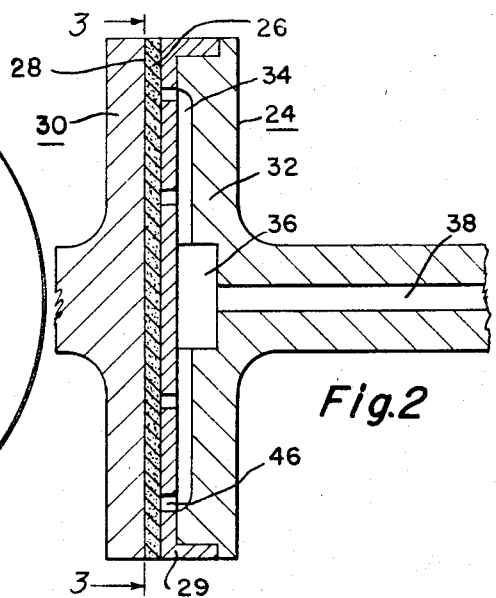
Fig. 2 is a view in cross section showing the porous facing of one friction member in contact with the friction facing of a second member.
Figure 1:
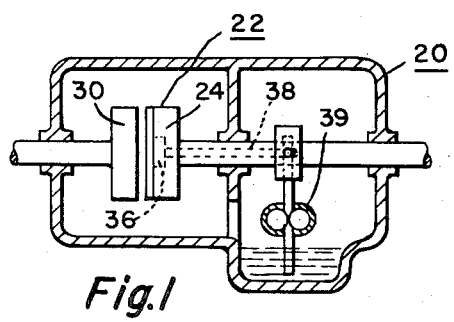
Fig. 1 is a diagrammatic view in section showing a wet clutch structure.

In the drawings, a housing 20 is shown wherein a torque transmitting element 22 is rotatably carried. The frictional element 22 is adapted for use as a clutch, brake, etc., and has a driving member 24 and a member 30 adapted to be driven thereby when the members have their faces in frictional engagement as in Fig. 2 wherein the members 24 and 30 are shown in friction engagement. Member 24 has a porous metal facing 26 that covers at least a portion of its engaging surface and is adapted to engage a mating surface 28 on member 30 whereby the two surfaces when in contact with one another will rotate in driving and driven relationship or vice versa if desired.

The porous facing 26 of rotating driving member 24 is fabricated from porous metal preferably bonded to support structure 32 of member 24, as disclosed in Patent 2,289,658 to Roland P. Koehring or Re. 21,495 to Charles R. Short both of which patents are assigned to the assignee of the present invention.

Figure 3:
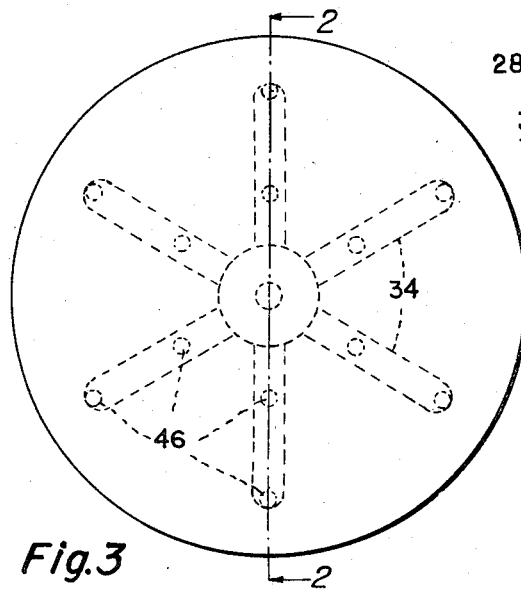
Fig. 3 is a view taken on line 3—3 in Fig. 2.

The porous metal facing 26 preferably covers the entire surface of support structure 32 to provide a coextensive surface of porous material for engagement with facing 28 of member 30. A plurality of radial channels or grooves 34, Fig. 3, are formed in the support structure 32 or in the porous material of the facing and have portions thereof leading to passages 46 formed in a subfacing 29 to which the back face of the porous material 26 is preferably coextensively bonded. The channels 34 radiate from a central chamber 36 which is connected to a channel 38 which may serve as a drain or, if desired a fluid conducting channel for the fluids from a pump 39.

The clutch or brake structure described is preferably operated within a fluid and when the friction faces operating in said fluid are brought into mating relation with one another, the fluid, such as oil, will be entrapped to some extent between the facings and thus cause undesirable temporary slippage. The present invention is directed to the removal of this entrapped fluid.

This invention is further directed to a structure adapted to permit the use of higher engaging pressures. This is accomplished by cooling the porous metal facing with a suitable coolant which may be circulated through the porous metal by pump 39 which passes the coolant fluid through channel 38 into chamber 36 and thence through channels 34 to the porous metal where it is centrifugally exhausted.

Figure 4:
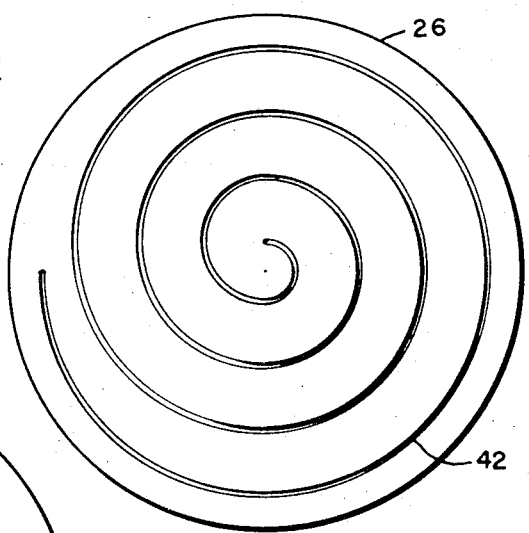
Fig. 4 is a modification of the facing shown in Fig. 2 wherein a spiral groove has been formed on the engaging side of the facing.

In Fig. 4, a modification of the device is shown wherein a spiral groove 42 is provided on the frictional engaging surface of the porous facing 26 of the rotating member 24. This spiral groove is adapted to receive fluids which pass from chamber 36 through channels 34 and through the facing 26. The spiral arrangement of this groove will not only more rapidly conduct the fluid from the central portion of the frictional facing as the members are brought into engagement but it will also distribute the fluid throughout the facing material and permit centrifugal seepage to more readily take place and thereby provide a higher degree of cooling for the porous material 26.

Figure 5:
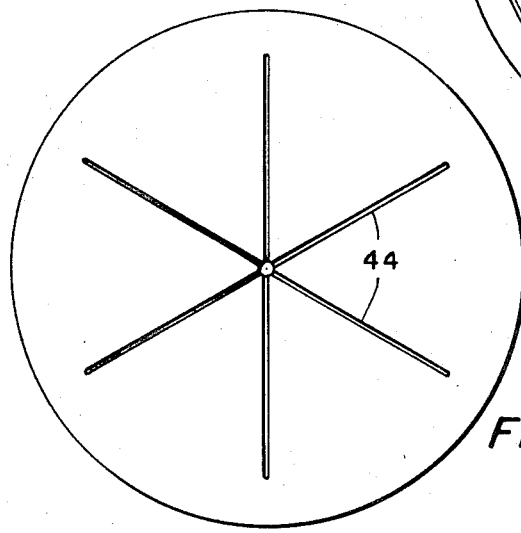
Fig. 5 shows another modification of the facing shown in Fig. 2 wherein radial channels have been formed in the porous metal forming the friction facing.

In Fig. 5 radial channels 44 are shown in the porous metal and serve the same purpose as channels 34 which are in contact with the porous material 26 through holes 46. The radial grooves 44 connect with chamber 36 and provide for the passage of fluid away from the porous facing 26 as the surface is brought into engagement and further the grooves 44 will pass cooling fluids to the surface, if desired when a pump 39 is used.

It is apparent the porous metal facing 26 with its fluid receiving passages 34 or 44 will permit the passage of fluids therethrough in either direction and thus provide for a positive and faster engagement between the friction surfaces of a rotating and a rotated member together with more efficient cooling of the structure. It is manifest that any proper pressure control (not shown) may be employed, the flow of a fluid may be regulated when passed through the porous material, so the fluid may be made to flow first in one direction and then have its direction of flow reversed if desired.

It is to be noted the type of material forming the friction surfaces is preferably of a suitable porous metal and which is adapted to pass fluids to the collecting chambers when the further surfaces are in engagement. Further the fluids employed may be of any suitable liquid such as oil or other liquids which will withstand the temperatures normally encountered in the particular application.

While the embodiment of the present invention constitutes a preferred form it is to be understood other forms might be adopted.

What is claimed is as follows:

1. A structure adapted for use with a porous metal friction facing operating in a fluid, comprising in combination; a disc-like member associated with said facing and forming a support therefor, a channel in said member having at least a portion thereof in communication with said porous facing for receiving fluid passing through said facing in one direction, and a channel in said facing separated from the channel in said member by the material of said facing for conducting fluid flowing through said facing in the opposite direction.

2. In a wet type clutch, brake, etc., wherein two disc-like members which are normally separated by a fluid are moved relative to each other to displace said fluid and cooperate with one another, the combination comprising, a porous metal facing having one surface in intimate contact with one of said members and another surface arranged to frictionally engage the other member, means including a channel in said one member arranged to conduct fluid away from said one surface when said members displace the fluid therebetween, and means including a channel in the other surface of said porous metal facing for supplying fluid to said other surface after said facing frictionally engages the other member.

3. A structure adapted for use with brakes, clutches and the like operating in a fluid, comprising in combination; a first disc-like member having a frictional surface thereon and having at least a portion thereof formed of a layer of porous material intimately connected with said first member, a second disc-like member normally separated from said first member and having a facing adapted for forming a frictional engagement with the frictional surface of said first member as said facings are moved from a separated into contacting relation with each other, and a channel in said first member in communication with the portions of said porous frictional facing material remote from said frictional engaging surface, said channel being adapted for conducting fluid that is entrapped between the facings of the members when said entrapped fluid passes through said porous material when said facings are brought into contact with each other.

4. A structure adapted for use with brakes, clutches and the like operating in a fluid, comprising in combination; a disc-like rotating member having at least a portion of its frictional surface formed of a layer of porous material, a second disc-like member having a facing adapted for forming a frictional engagement with the frictional surface of said rotating member when said members are brought into juxtaposition, a channel in said first mentioned member in communication with portions of said layer of porous material remote from the frictional engaging surfaces thereof, and a spiralled channel in the frictional engaging surface of said layer, said channel being constructed and arranged for conducting fluids passing through the porous material of said facing as said member is rotated and said members are brought into frictional engagement.

References Cited in the file of this patent

UNITED STATES PATENTS

| Number | Name | Date |
|---|---|---|
| 480,982 | Wohlfarth | Aug. 16, 1892 |
| 535,738 | Smith | Mar. 12, 1895 |
| 987,954 | Brush | Mar. 28, 1911 |
| 1,189,176 | Price | June 27, 1916 |
| 1,882,037 | Roberts | Oct. 11, 1932 |
| 1,912,101 | Short | May 30, 1933 |
| 2,380,680 | Thompson | July 31, 1945 |
| 2,421,925 | Cooley | June 10, 1947 |
| 2,526,049 | Schroeder | Oct. 17, 1950 |
| 2,556,809 | Hobbs | June 12, 1951 |
| 2,610,096 | Mallory | Sept. 9, 1952 |
| 2,632,544 | Hockert | Mar. 24, 1953 |